Patented July 21, 1953

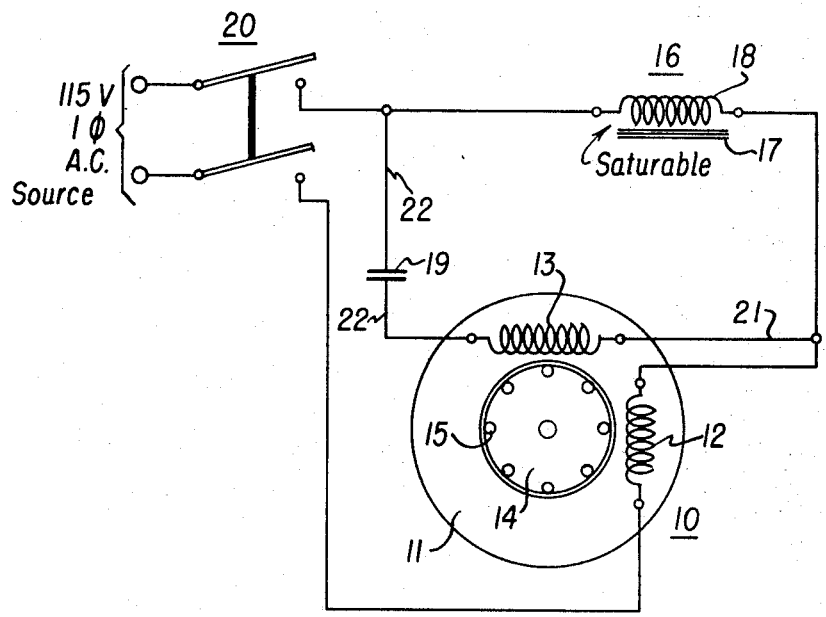

2,646,538

UNITED STATES PATENT OFFICE 2,646,538

INDUCTION MOTOR OF THE CAPACITOR TYPE

Alexander J. Lewus, Cicero, Ill.

Application September 28, 1951, Serial No. 248,730

8 Claims. (Cl. 318—221)

The present invention relates to induction motors of the capacitor type and more particularly to improved starting and running circuits for such motors. This application is a continuation in part of the copending application of Alexander J. Lewus, Serial No. 119,593, filed October 5, 1949, which is a continuation of Serial No. 48,305, filed September 8, 1948, which is a continuation of Serial No. 759,386, filed July 7, 1947, all now abandoned.

It is the general object of the present invention to provide in a single phase induction motor of the capacitor type, an improved and simplified starting and running circuit that develops a large starting torque in the motor and that does not require removal from the circuit of the associated capacitor during running of the motor.

Another object of the invention is to provide in a circuit of the character noted, an improved arrangement of a reactor having a saturable magnetic core and a capacitor of the dry electrolytic type, whereby the starting and running currents in the circuit are automatically controlled to insure quick starting of the motor and to prevent damage to the capacitor permanently connected in the circuit.

Further features of the invention pertain to the particular connection and arrangement of the elements of the electric motor and of the starting and running circuit therefor, whereby the above-outlined and additional operating features thereof are attained.

The invention, both as to its organization and method of operation, together with further objects and advantages thereof will best be understood by reference to the following specification taken in connection with the accompanying drawing, in which the single figure is a schematic electric diagram of an induction motor of the capacitor type and of the starting and running circuit therefor embodying the present invention.

Referring now to the single figure of the drawing, there is illustrated an induction motor 10 and a starting and running circuit therefor embodying the features of the present invention. The motor 10 is of the single phase split phase capacitor type including a stator 11 provided with angularly displaced main and auxiliary windings 12 and 13, and a rotor 14 provided with a squirrel-cage winding 15. Preferably the windings 12 and 13 are arranged in quadrature relation, the auxiliary winding 13 having starting and running impedances that are substantially smaller than the respective starting and running impedances of the main winding 12. The motor 10 may be of the fractional horsepower type or may have a rating as high as about 5 H. P.

The circuit comprises a reactor 16 including a saturable magnetic core 17 provided with a winding 18. Also the circuit includes a capacitor 19 of the dry electrolytic type that may consist of one or more individual cells either of the polarized or non-polarized type, the capacitor 19 having a relatively large capacitance and a low voltage rating. Finally the circuit arrangement comprises a source of single phase alternating current supply that may be a commercial source having a voltage of 115 volts and a substantially sinusoidal wave form, as well as a control switch 20 for governing the connection and disconnection of the source of current supply with respect to the circuit.

More particularly a common connection 21 is provided between one terminal of the reactor winding 18 and one terminal of the auxiliary winding 13 and one terminal of the main winding 12, the other terminal of the reactor winding 18 being connected to one terminal of the switch 20, and the other terminal of the main winding 12 being connected to the other terminal of the switch 20. Also a fixed connection 22 is provided between the other terminal of the reactor winding 18 and the other terminal of the auxiliary winding 13, that includes the capacitor 19, whereby the capacitor 19 and the auxiliary winding 13 are bridged in series circuit relation across the reactor winding 18. As previously noted, the magnetic core 17 of the reactor 16 is of the saturable type, the magnetic core 17 being saturated by the starting currents in the circuit and being unsaturated by the running currents in the circuit. Also the starting and running impedances of the main winding 12 are considerably larger than the respective starting and running impedances of the reactor winding 18; while the starting and running impedances of the reactor winding 18 are considerably larger than the starting and running impedances of the auxiliary winding 13.

Considering now the operation of the motor 10, when the control switch 20 connected to the source of current supply is closed, the reactor winding 18 and the main winding 12 are energized directly in series circuit relation; while the voltage drop across the reactor winding 18 is impressed directly across the auxiliary winding 13 and the capacitor 19 in series circuit relation. The main winding 12 has a relatively low starting impedance, whereby a relatively large starting current traverses the reactor winding 18 and the main winding 12, the starting current traversing the reactor winding 18 effecting saturation of the magnetic core 17 so that the voltage drop across the reactor winding 18 is relatively high and of a sharply peaked wave form and applied across the auxiliary winding 13 and the capacitor 19 in series circuit relation. Moreover, the starting impedance of the auxiliary winding 13 is relatively low, whereby the starting current traversing the auxiliary winding 13 is relatively large. Further, the capacitor 19 dephases the starting current traversing the auxiliary winding 13 substantially with respect to the starting current traversing the main winding 12, the angle therebetween being between 45° and 90°. Accordingly the relatively large dephased starting currents respectively traversing the main winding 12 and the auxiliary winding 13 disposed in quadrature relation develop a high starting torque between the rotating magnetic field in the stator 11 and the squirrel-cage winding 15 carried by the rotor 14, thereby to initiate breakaway and acceleration of the rotor 14.

As the rotor 14 is accelerated toward the synchronous speed of the motor 10 and into a speed somewhat in excess of 50% of the synchronous speed mentioned, the nonlinear characteristics of the motor 10 and of the reactor 16 change rather abruptly due fundamentally to the increasing impedances of the main winding 12 and the auxiliary winding 13 as a consequence of the induction therebetween and the rotating squirrel-cage winding 15. Accordingly at the speed mentioned, the starting currents respectively traversing the main winding 12 and the auxiliary winding 13 are abruptly reduced and further reduction thereof is effected as the rotor 14 gains speed.

Ultimately as the rotor 14 gains its normal running speed, somewhat below the synchronous speed by the slip speed, the running impedances of the main winding 12 and the auxiliary winding 13 are substantially increased with respect to the starting impedances thereof. More particularly the running impedance of the main winding 12 is relatively high, whereby the current traversing the reactor winding 18 is relatively small, in order that the magnetic core 17 is no longer saturated so that the voltage drop across the reactor winding 18 is of substantially sinusoidal wave form corresponding substantially to the wave form of the source of alternating current supply. Accordingly at this time, the voltage drop across the reactor winding 18 is relatively small so that a small operating current traverses the auxiliary winding 13 and the capacitor 19. Hence the motor 10 runs substantially entirely as a single phase induction motor, substantially all of the power supplied thereto being supplied by the operating current traversing the main winding 12, the operating current traversing the auxiliary winding 13 being so small that it is not necessary to disconnect the capacitor 19 from its circuit position in series relation with the auxiliary winding 13. Specifically the operating voltage impressed upon the capacitor 19 is sufficiently small that the operating current is so small that there is no damage to the capacitor 19, notwithstanding the circumstance that it has a relatively large capacitance and may take the form of one or more individual dry electrolytic cells, either of the polarized or non-polarized type, as previously noted.

For example, employing a ⅙ H. P. motor of the character described having a synchronous speed of 1800 R. P. M., and operative at approximately 1750 R. P. M. at full load, it was determined that when the starting and running voltages of 110 and 118 volts were impressed upon the main winding, the corresponding starting and running currents were approximately 11.0 and 2.5 amperes, respectively, and that when the starting and running voltages of 3 and 12 volts were impressed upon the auxiliary winding, the corresponding starting and running currents were approximately 19.00 and 2.25 amperes, respectively. In this circuit arrangement the auxiliary winding comprised 100 turns, the main winding comprised 400 turns and the reactor winding comprised 150 turns, whereby the starting and running impedances of the auxiliary winding were only about 1/60 and 1/10 of the respective starting and running impedances of the main winding. Also the dry electrolytic capacitor had a capacitance of about 2000 microfarads and a 30 volts rating, the starting and running voltages across the capacitor being approximately 26 and 3 volts, respectively. Further when the starting and running voltage drops of 24.5 and 12.5 volts were developed across the reactor winding the corresponding starting and running currents were 10 and 1 ampere, respectively. Moreover, under starting conditions the main and auxiliary windings possessed high ampere turns and the starting currents were substantially dephased, whereby the motor developed a starting torque that was somewhat in excess of 250% of the normal running torque thereof at the rated H. P. noted. Finally under running conditions the ampere turns of the auxiliary winding were considerably reduced with respect to the ampere turns of the main winding of the motor.

In view of the foregoing, it is apparent that there has been provided a single phase split phase induction motor of the capacitor type and a starting and running circuit therefore of improved connection and arrangement that develops a high starting torque in the motor and that does not require removal from the circuit of the associated capacitor during running of the motor.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In combination, an induction motor including a stator provided with angularly displaced main and auxiliary windings and a rotor provided with a squirrel-cage winding, a reactor including a saturable magnetic core provided with a winding, a common connection between one terminal of said reactor winding and one terminal of said auxiliary winding and one terminal of said main winding, a capacitor, and a fixed connection including said capacitor between the other terminal of said auxiliary winding and the other terminal of said reactor winding, said other terminal of said reactor winding and the other terminal of said main winding being connectible to a source of single phase alternating current supply having a substantially sinusoidal wave form to effect starting and running of said rotor, the starting and running impedances of said main winding being respectively low and high with respect to each other so that said magnetic core is respectively saturated and unsaturated by the starting and running currents traversing said reactor winding, said starting and running currents traversing said reactor winding respectively producing peaked starting and substantially sinusoidal running voltage drops thereacross that are respectively high and low with respect to each other and the starting and running impedances of said auxiliary winding being respectively low and high with respect to each other so that the starting and running currents traversing said capacitor and said auxiliary winding are respectively high and low with respect to each other, said capacitor effecting a substantially dephasing of the starting current traversing said auxiliary winding with respect to the starting current traversing said main winding so as to produce a substantial starting torque between said stator and said rotor.

2. The combination set forth in claim 1, wherein the starting and running impedances of said main winding are considerably higher than the impedance of said reactor winding, and the starting and running impedances of said auxiliary winding are substantially lower than the respective starting and running impedances of said main winding.

3. In combination, an induction motor including a stator provided with angularly displaced main and auxiliary windings and a rotor provided with a squirrel-cage winding, a reactor including a saturable magnetic core provided with a winding, a common connection between one terminal of said reactor winding and one terminal of said auxiliary winding and one terminal of said main winding, a capacitor, a fixed connection including said capacitor between the other terminal of said auxiliary winding and the other terminal of said reactor winding, a source of single phase alternating current supply, and switching means for connecting said other terminal of said reactor winding and the other terminal of said main winding to said source to effect starting and running of said rotor, said magnetic core being respectively saturated and unsaturated by the starting and running currents traversing said reactor winding, said capacitor effecting a substantial dephasing of the starting current traversing said auxiliary winding with respect to the starting current traversing said main winding.

4. The combination set forth in claim 3, wherein said capacitor is of the dry electrolytic type.

5. The combination set forth in claim 4, wherein said dry electrolytic capacitor is of the polarized type.

6. The combination set forth in claim 4, wherein said dry electrolytic capacitor is of the nonpolarized type.

7. The combination set forth in claim 1, wherein the starting and running impedances of said reactor winding are considerably larger than the respective starting and running impedances of said auxiliary winding.

8. The combination set forth in claim 3, wherein the starting and running voltages impressed across said capacitor are respectively substantially at and considerably below the rated voltage of said capacitor.

ALEXANDER J. LEWUS.

References Cited in the file of this patent

UNITED STATES PATENTS

| Number | Name | Date |
| --- | --- | --- |
| 505,859 | Stanely et al. | Oct. 3, 1893 |
| 620,965 | Rice et al. | Mar. 14, 1899 |
| 848,925 | Schattner | Apr. 2, 1907 |
| 1,708,910 | Spencer | Apr. 9, 1929 |
| 2,120,321 | Bargdill | June 14, 1938 |